Nov. 26, 1968 E. ZILLMER 3,412,495
SLIDE-CONTROLLING STRUCTURE FOR PHOTOGRAPHIC PROJECTORS
Filed Feb. 21, 1966 7 Sheets-Sheet 3

Nov. 26, 1968  E. ZILLMER  3,412,495
SLIDE-CONTROLLING STRUCTURE FOR PHOTOGRAPHIC PROJECTORS
Filed Feb. 21, 1966  7 Sheets-Sheet 6

Nov. 26, 1968  E. ZILLMER  3,412,495
SLIDE-CONTROLLING STRUCTURE FOR PHOTOGRAPHIC PROJECTORS
Filed Feb. 21, 1966  7 Sheets-Sheet 7
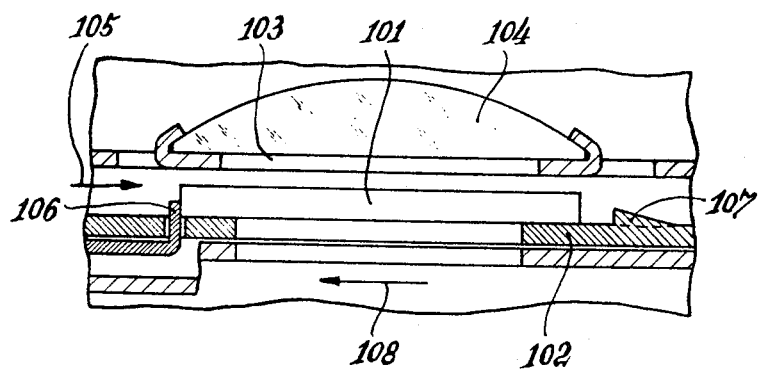
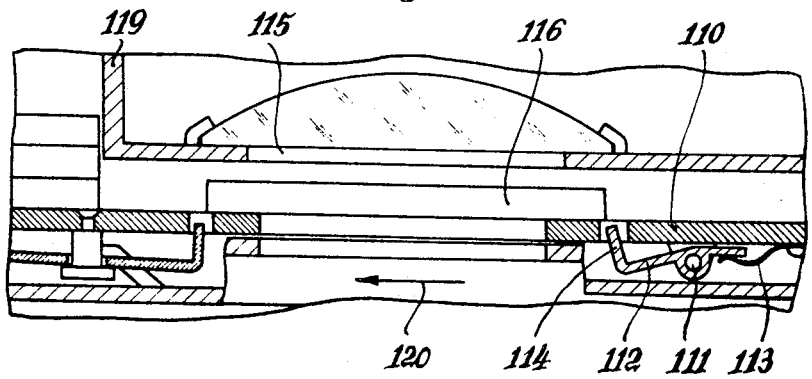
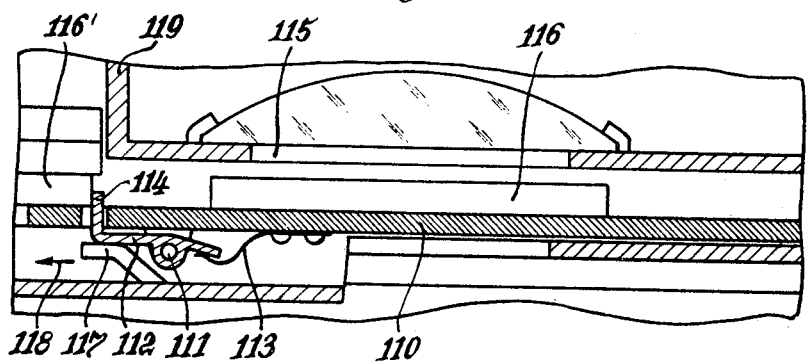

United States Patent Office 3,412,495
Patented Nov. 26, 1968

3,412,495
SLIDE-CONTROLLING STRUCTURE FOR
PHOTOGRAPHIC PROJECTORS
Erich Zillmer, Braunschweig, Germany, assignor to
Voiglander A.G., Braunschweig, Germany, a corporation of Germany
Filed Feb. 21, 1966, Ser. No. 528,870
15 Claims. (Cl. 40—79)

ABSTRACT OF THE DISCLOSURE

A photographic slide projector with respect to which slides in a container forming part thereof are adapted to pass successively through an outlet from said container to a projection position and wherein the outlet is great enough to permit a slide of maximum thickness to pass therethrough, and wherein slide changing means engage and transfer the slide through the outlet to the projection position; blocking means being provided to obstruct part of the container outlet to permit only a slide of less than maximum thickness to pass therethrough from the container to the projection position; the blocking means having a non-blocking position with no obstruction of the container outlet to permit a slide of maximum thickness to pass from the container to the projector position; and sensing means for sensing the thickness of a slide which is in position to pass through the outlet from said container to the projection position, said sensing means responding to the sensing of a slide of varying thickness to control the positioning of the blocking means to its blocking or non-blocking position.

---

The present invention relates to photographic projectors.

The term "projectors" is intended to include not only that type of photographic projector capable of projecting an image onto a screen, but also viewers in which an image can be viewed on a screen directly carried by the viewer itself.

The invention relates in particular to the manner in which slides are moved in a photographic projector.

It is conventional in photographic projectors to arrange the slides which are to be projected in a suitable container having an outlet through which the slides are successively displaced by a slide-changer from the container to a projecting position. Because slides can have different thicknesses, the container outlet must be made of a size great enough to permit free passage of a slide of maximum thickness. Since a slide of less than maximum thickness might be carried along with another slide also of less than maximum thicknes through an outlet which is large enough for a slide of maximum thickness, it is known to provide blocking devices which operate to permit only one slide to be displaced through the outlet at any one time. Since the outlet of the container must in general have a size large enough to permit passage of a slide of maximum thickness which may be three times thicker than a slide of minimum thickness, there is of course the possibility of simultaneous movement of more than one slide through the outlet to the projection position unless measures are taken to limit the operation to displacement of only one slide at one time from the container to the projection position. Where the slide of maximum thickness is three times as thick as a slide of minimum thickness, it is of course possible not only for two slides but also for three slides of minimum thickness to move simultaneously through the outlet of the container to the projection position unless measures are taken to prevent this.

The slides in the container press against each other either due to their own weight or under the pressure of a spring, and therefore the adjoining slides frictionally engage each other. It is this frictional engagement which results in the tendency of two or more slides to move together.

The known devices for preventing more than one slide at one time from being displaced out of the container to the projection position include spring-operated blocking elements capable of being displaced only by a slide which actually engages and is moved by the slide changer. These known blocking elements prevent a slide which frictionally engages the slide to be moved by the slide changer from moving with the latter slide. The springs of the known blocking structure must be relatively strong, since the slides engage each other not only as a result of adhesion due to friction but also as a result of mechanical influences such as the overlapping of a rough edge of one slide with another slide or the engagement between a rough exterior surface of one slide with a correspondingly rough exterior surface of the neighboring slide. Thus, with the conventional structure when the slide changer is actuated to displace a slide from the container to the projection position, it is necessary not only to exert a force required to move the slide to the projection position but also a force required to overcome and oppose the spring elements of the blocking structure. As a result of the requirement of applying the additional force required to oppose the springs of the blocking structure, the functioning of the structure can be disadvantageously influenced.

It is a primary object of the present invention to provide a structure which will avoid the above disadvantages of the spring-operated blocking structures.

In particular, it is an object of the invention to provide a structure which will limit the slide-changing in a highly reliable manner to only one slide at one time while at the same time preventing simultaneous movement of additional slides with a structure which requires no spring-operated elements.

In particular, it is an object of the invention to provide a simple rugged structure which is highly reliable in operation and which can be very easily actuated to bring about the desired displacement of the slides.

Furthermore, it is an object of the invention to provide a structure which will in no way rub undesirably against the slides during any part of the operation of the structure of the invention.

With the structure of the invention the slides are situated in a container which is formed with an outlet large enough to permit free passage of a slide of maximum thickness. A slide-changing means is movable transversely of the container from a starting position to an end position and then back to the starting position, this slide-changing means when in its starting position engaging a slide and displacing the latter through the outlet to a projection position during movement of the slide-changing means from its starting to its end position. Then the slide-changing means returns from its end position back to its starting position in preparation for displacement of the next slide to the projection position. A blocking means is situated in the region of the outlet of the container for movement between a non-blocking position displaced from the outlet so as to provide no obstruction thereof and a blocking position blocking part of the outlet. A sensing means senses the thickness of the next slide which is to be projected and in response to the sensed thickness actuates the blocking means either to displace the latter to its blocking position in the event that the next slide is a slide of less than maximum thickness, or to leave the blocking means in its non-blocking position in the event that the next slide is of maximum thickness.

The invention is illustrated by way of example in the accompanying drawings which form part of the application and in which.

FIG. 15 is a fragmentary sectional plan view illustrating how another part of a projector operates; and FIGS. 16 and 17 are fragmentary sectional plan views of a further feature of the invention capable of being used with any of the embodiments thereof to avoid a problem encountered with the structure of FIG. 15, the parts being shown in different operating positions in FIGS. 16 and 17, respectively.

Figure 1:
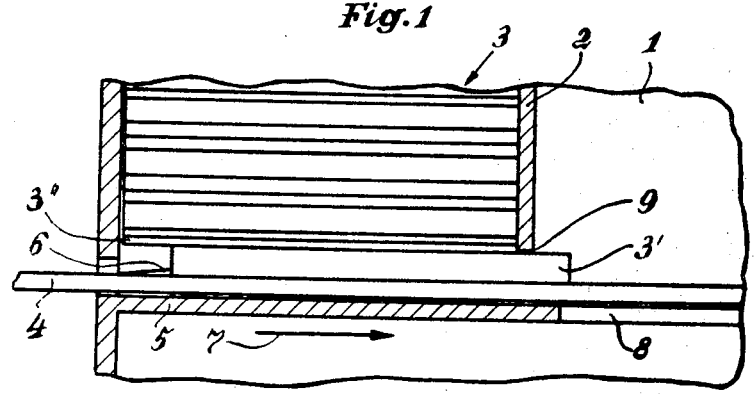
FIGS. 1–3 are schematic, fragmentary, partly sectional illustrations of different operating positions of a slide-changing structure, in order to show the functions performed by the structure of the invention.

The projector 1 which is only fragmentarily illustrated in FIG. 1, has a slide-container 2 which is built into the projector and in which a series of slides 3 of different thicknesses are located in engagement with each other. The slides 3 engage each other either due to their own weight or as the result of the force of the spring which urges the slides against each other. Thus, either as a result of their own weight or as a result of the force of a spring the slides in the container 2 will be displaced so that the next slide which is to be moved to the projection position will be in the path of movement of the slide changer 4. The slide-changer 4 is in the form of a plate which is guided for shifting movement transversely of the slide-container 2 between an intermediate plate 5 which slideably engages and guides the slide-changer 4 and the slide-container 2. The slide-changer 4 fixedly carries a slide-engaging projection 6 which during movement of the slide-changer 4 in the direction of the arrow 7 of FIG. 1 from the starting position of the slide-changer shown in FIG. 1 will engage the left edge of the slide 3′ of FIG. 1 to displace the latter to the projection position during movement of the slide-changer 4 from the illustrated starting position toward an end position where the slide 3′ is in the projection position. Actually the slide-changer 4 is shown in FIG. 1 between its starting and end positions since the projection 6 engages the slide 3′ when the latter is fully within the container 2. The intermediate wall 5 is provided with a projection window 8 with which the slide 3′ is aligned when located in the projection position. Thus, the parts are shown in FIG. 1 in intermediate position where the slide 3′ has already been moved part of the way out of the container 2 toward the projection position. It is shown in a position partly overlapping the projection window 8.

The particular slide 3′ which is shown in FIG. 1 is a slide of maximum thickness. In order to accommodate a slide of maximum thickness the container 2 is formed with an outlet 9 which is substantially filled by the slide 3′ as it moves out of the container 2 into the projection position. Because the opening or outlet 9 is only large enough to accommodate a slide 3′ of maximum thickness, the next slide 3″ which engages the slide 3′ cannot move through the opening or outlet 9 with the slide 3′.

Figure 2:
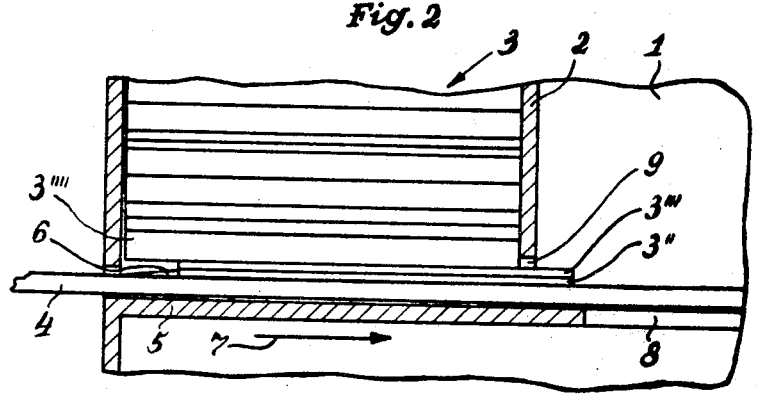

If, however, as shown in FIG. 2, during the next operating cycle of the slide-changer 4, a slide 3″ of minimum thickness is engaged by the projection 6, then it is possible for the next following slide 3‴ which is also of minimum thickness, by frictional clinging engagement with the slide 3″, to move with the latter through the outlet 9, as shown in FIG. 2. The engagement between the slides 3″ and 3‴ has sufficient adhering force to cause the slide 3‴ to move with the slide 3″ even though the projection 6 engages only the slide 3″. Thus, the outlet 9 is large enough to provide for simultaneous movement of both slides 3″ and 3‴ and prevents only movement of the next following slide 3″″.

Figure 3:
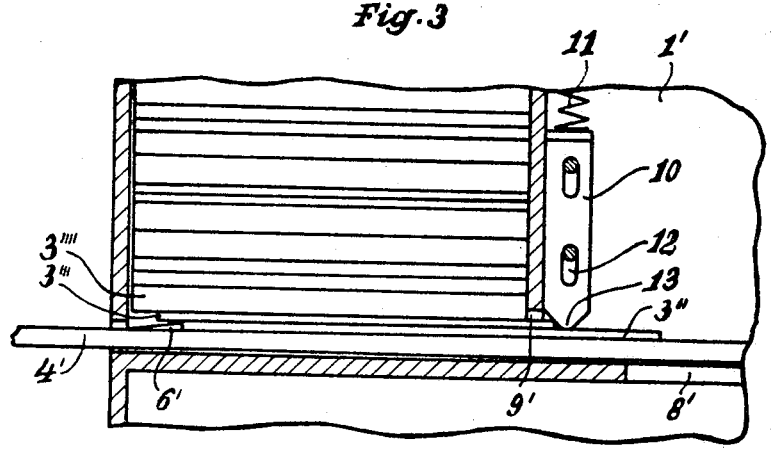

FIG. 3 shows the principle of operation of a known blocking structure which will avoid the defective operation illustrated in FIG. 2. The fragmentarily illustrated projector 1′ of FIG. 3 has the same construction as the projector of FIGS. 1 and 2. However, the projector of FIG. 3 is provided with a blocking element 10 situated at the outlet 9′. A compression spring 11 urges the blocking member 10 into the illustrated end position determined by the pin-and-slot structure 12. At this time, the tip 13 of the blocking element 10 is spaced from the slide-changer 4′ by a distance only great enough to permit free movement of a slide 3″ of minimum thickness through the gap between the tip 13 and the slide-changer 4′. It is apparent that the next-following slide 3‴ of minimum thickness will be retained by the tip 13 of the blocking element 10 againt movement together with the slide 3″ to the projection window 8′.

With this construction of FIG. 3, however, when a slide of intermediate or maximum thickness, such as a slide 3″″ is to be moved to the projection position aligned with the projection window 8′, then after passing through the outlet 9′, such a slide will also engage the tip 13 of the blocking element 10. With such a slide the force thereon exerted by the projection 6′ will necessarily have to be large enough to enable to slide to engage the blocking element and displace it rearwardly in opposition to the spring 11, so as to provide between the tip 13 and the slide-changer 4′ a gap large enough to permit the thicker slide to pass therethrough. However, under these conditions the tip of the blocking element 10 presses against the frame of the slide and can damage the exterior surface thereof. Furthermore, it is necessary to actuate the slide-changer 4′ at this time with a force great enough to overcome the force of friction of the pressure of the blocking element 10 against the slide, and this greater force may result in undesirable shifting of the entire projector if it does not have the required resistance to movement on its support.

The structure of the invention described below avoids these drawbacks.

Figure 4:
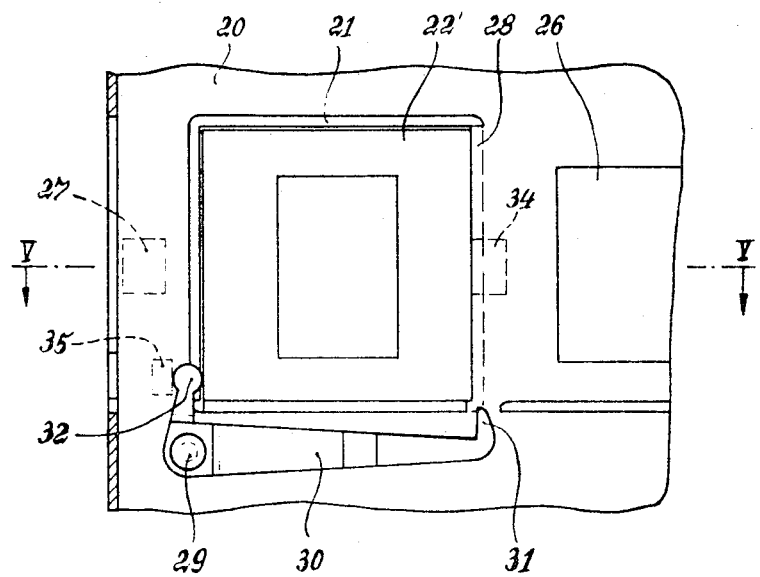
FIG. 4 is a fragmentary, partly sectional elevation showing one possible embodiment of a structure of the invention in a non-blocking position, FIG. 4 being taken along line IV—IV of FIG. 5 in the direction of the arrows.
Figure 5:
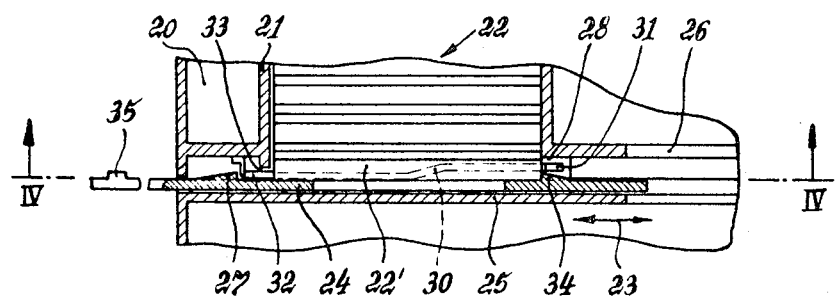
FIG. 5 is a sectional plan view of the structure of FIG. 4 taken along line V—V of FIG. 4 in the direction of the arrows.
Figure 6:
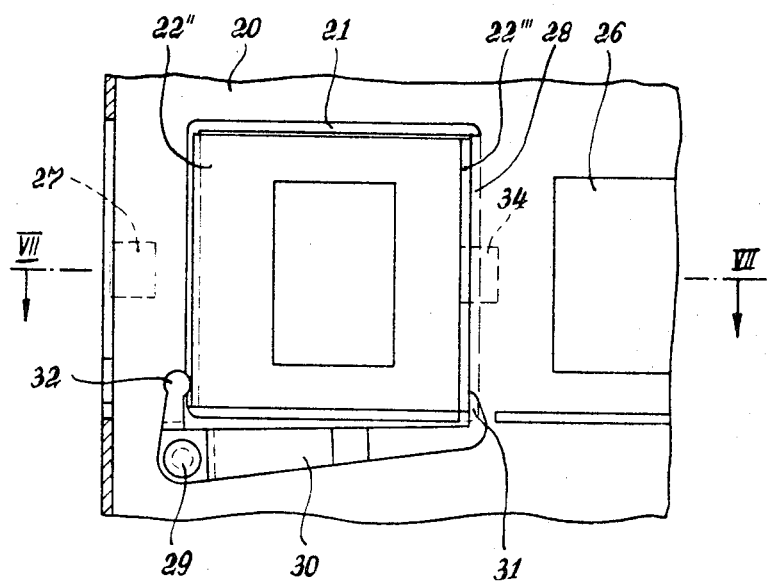
FIG. 6 shows the structure of FIG. 4 in a blocking position, FIG. 6 being taken along line VI—VI of FIG. 7 in the direction of the arrows.
Figure 7:
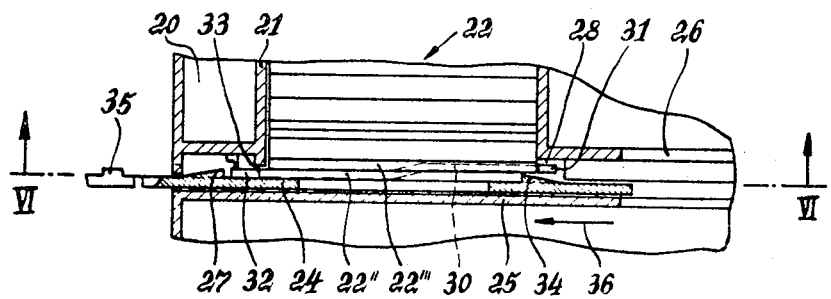
FIG. 7 is a sectional plan view of the structure of FIG. 6 taken along line VII—VII of FIG. 6 in the direction of the arrows.

FIGS. 4 and 5 show in a front and plan view details of one embodiment of a blocking structure according to the invention, this structure being illustrated again in FIGS. 6 and 7 in another operating position.

The illustrated projector 20 includes, in the same way as the projector already described above in connection with FIGS. 1–3, a slide-container 21 provided with a plurality of slides 22. The slides are successively displaced by a slide-changing means 24 which moves back and forth in the direction of the double-headed arrow 23 shown in FIG. 5. The slide-changing means 24 includes a plate which is guided for sliding movement by an intermediate wall 25, and this slide-changing means moves transversely of the container 21 from a given starting position where it receives the end slide to an end position where this latter slide is situated in a projection position aligned with the projection window 26. When the next slide is displaced to the projection position, the previously projected slide is displaced from the projection position in a known manner to an unillustrated collection container. In order to shift a slide from the container to the projection position, the slide-changing means 24 includes a slide-engaging projection 27. The container 21 is formed with an outlet 28 through which the slides can successively be displaced from the container to the projection position, and the outlet 28 has a width great enough to permit a slide of maximum thickness to pass therethrough.

In order to prevent a pair of slides a minimum thickness from passing simultaneously through the outlet 28, so as to provide improper projection, the following structure of the invention is provided.

A stationary pivot 29 pivotally carries a blocking lever 30 which can turn on the pivot 29 only in opposition to a substantial force of friction, so that the lever 30 will tend to remain in whichever angular position it has been displaced to on the pivot 29. This lever 30 forms a blocking means of the invention capable of being moved between the non-blocking position of FIG. 4 where the blocking means is displaced from the outlet 28 into the blocking position of FIG. 6 where the blocking means obstructs part of the outlet 28. For this purpose the blocking lever 30 has a blocking leg 31 which, in accordance with the particular position of the blocking lever, either is situated beyond the region of the outlet 28 (see FIG. 4) or in the region of the opening 28 (see FIG. 6). The blocking leg 31 is dimensioned and arranged in such a way that in its blocking position it reduces the width of the opening 28 to such an extent that it is only possible for a slide of minimum thickness to pass through the unobstructed part of the outlet 28.

A sensing means is provided for sensing the thickness of the slide which is to be next shifted to the projection position, and this sensing means is operatively connected with the blocking means 30 so as to leave the latter in its non-blocking position in the event that a maximum thickness is sensed or so as to automatically displace the blocking means to the blocking position of FIG. 6 in the event that the sensing means senses a slide of less than maximum thickness. This sensing means includes a sensing leg 32 which is fixed to and projects from the lever 30. As is particularly apparent from FIGS. 5 and 7, the lever 30 has an offset portion intermediate its ends, and this offset portion situates the blocking leg 31 in a plane different from that occupied by the sensing leg 32. Thus, while the sensing leg 32 is situated directly in engagement with the slide-changing means 24, the blocking leg 31 is displaced from the slide-changing means 24. The sensing means includes not only the sensing leg 32 which is fixed to the lever 30 but also a sensing opening 33 which is formed in a wall of the container 21 opposite to the outlet 28. A slide which is displaced into the sensing opening 33 can come into engagement with the sensing leg 32. The sensing opening 33 into which the sensing leg 32 extends when the blocking means 30 is in its non-blocking position is narrower than the outlet 28 so that only a slide of less than maximum thickness can move into the sensing opening 33 to engage the sensing leg 32.

The slide-changing means 24 is provided with a second slide-engaging member or projection 34 which is opposed to the projection 27 and operates during shifting of the slide-changing means in a reverse direction from its end position back to its starting position. In addition, the slide-changing means 24 fixedly carries a positioning means 35 used to position the sensing means in its sensing position, in a manner described below.

The positioning means formed by the projection 35 carried by the slide-changer 24 is situated at a position on the latter which locates the positioning means 35 in engagement with the sensing means 32 when the slide-changer 24 has been displaced from its starting position to its end position locating a slide at the projection position in alignment with the projection window 26. FIG. 4 shows the parts in this position with the projection 35 schematically indicated in engagement with the sensing leg 32. Thus, the displacement of the slide-changing means from its starting to its end position displaces the positioning means 35 to a position where it will move the sensing means to its sensing position and where the blocking means will be situated in its non-blocking position. In this position of the parts shown in FIG. 4 the sensing leg 32 has been displaced into the sensing opening 33 and engages an edge of the next slide which is to be projected.

In the case of the example of FIGS. 4 and 5, the sensing leg 32 engages a slide 22′ of maximum thickness. When the slide-changer 24 is returned from its end position, locating a slide at the projection position in alignment with window 26, back to its starting position for engaging and moving the next slide to the projecting position, the slide-engaging projection 34 of the slide-changing means engages the next slide 22′ just before the slide-changer 24 reaches its starting position, and the slide-changer 24 through the projection 34 seeks to displace the next slide 22′ to the left, as viewed in FIG. 5, into the sensing opening 33. However, since this opening, as pointed out above, has a width which is only great enough to permit entrance of a slide of less than maximum thickness, the slide 22′ which is of maximum thickness cannot enter into the sensing opening 33, and thus the slide 22′ cannot be moved to the left and cannot displace the sensing leg 32. Therefore, the sensing means senses a slide of maximum thickness and does not have any influence on the position of the blocking means, so that the blocking lever 30 remains in the non-blocking position thereof illustrated in FIG. 4, where the blocking leg 31 is displaced from the outlet 28. Thus, the parts are shown in FIG. 5 with the slide-changer 24 in its starting position since it cannot move further to the left, as viewed in FIG. 5. Now the slide-changer 24 can be moved to the right from its starting position to its end position so as to displace the slide 22′, by engaging the latter with the projection 27, through the outlet 28 into the projection position, and of course the outlet 28 is substantially filled by the slide 22′ of maximum thickness.

On the other hand, if, as shown in FIG. 6 and 7, the next slides which are to be projected in succession are slides 22″ and 22‴, both of which are of minimum thickness, then when the slide-changer 24 moves in the direction of the arrow 36 (FIG. 7) back to its starting position, the projection 34 will engage the slide 22″ of minimum thickness and move it into the sensing opening 33. The projection 34 projects only through a distance great enough to enable it to engage only the slide 22″ of minimum thickness. As the slide 22′ moves into the sensing opening 33 it displaces the sensing leg 32 of the sensing means so that the blocking lever 30 is automatically turned about its pivot 29, and now the blocking means will be in the blocking position shown in FIG. 6 where the blocking leg 31 obstructs part of the outlet 28, as indicated in FIGS. 6 and 7. Now the slide-changer 24 has reached its starting position, which is somewhat to the left of the starting position thereof shown in FIGS. 4 and 5. The blocking leg 31 is in the region of the outlet 28 and limits the width thereof to such an extent that it is only possible for the slide 22′ of minimum thickness to pass therethrough. The next slide 22''' which engages the slide 22'' is situated in the same plane as the blocking leg 31 and is prevented by the latter from moving with the slide 22' as a result of frictional engagement therewith.

Thus, with the above-described structure the outlet 28 can have two different widths, namely the fully open width or a width which is reduced by the blocking leg 31. The structure is therefore adapted for use with slides of two different thicknesses.

Figure 8:
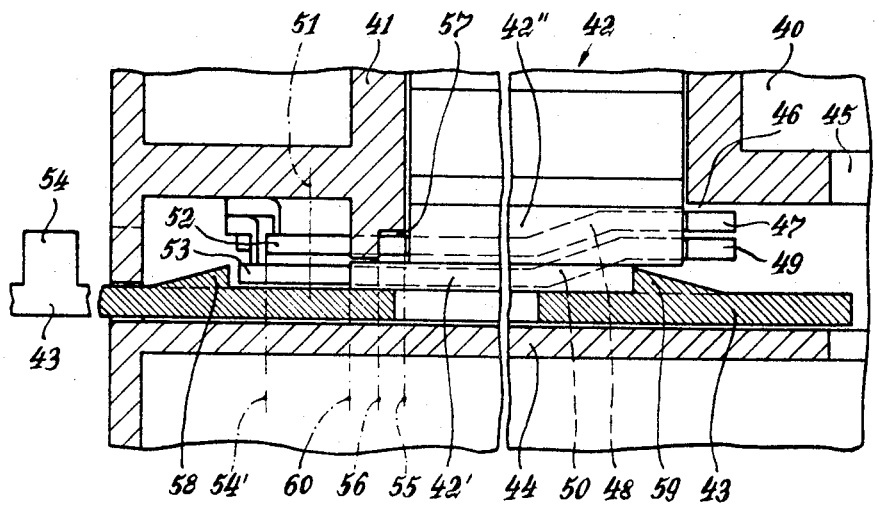
FIGS. 8 and 9 are sectional plan views of a second embodiment of a structure according to the invention, these figures showing the structure of this embodiment under two different operating conditions, respectively.
Figure 9:
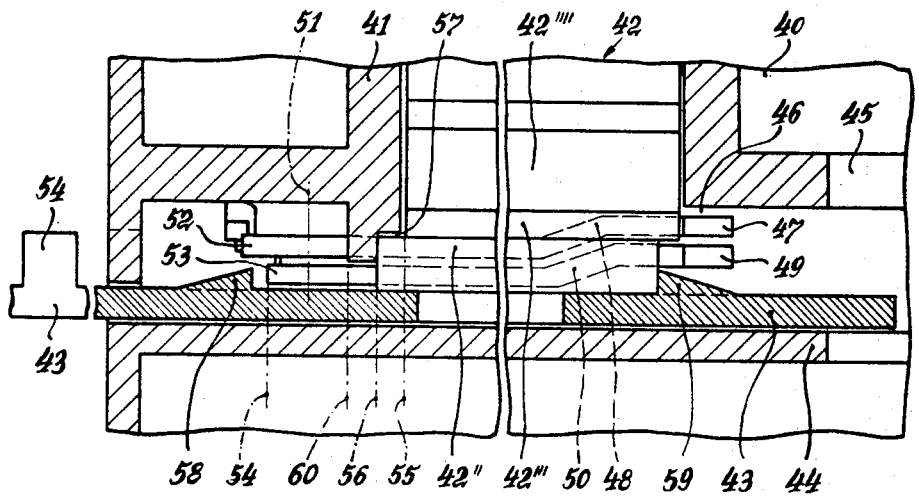

FIGS. 8 and 9 show an embodiment of the invention which has the same operating principles as that of FIGS. 4–7, but which is adapted to be used with slides of three different thicknesses. Thus, in this case it can be assumed that the slides of maximum thickness are three times as thick as the slides of minimum thickness while a slide of intermediate thickness is twice as thick as a slide of minimum thickness.

The illustrated projector 40 also has a slide-container 41 for the series of slides 42 which are situated therein. The slide-changing means 43 is shiftable transversely of the container 41 in order to successively move the slides to a projection position aligned with the projection window 45. During movement of the slides from the slide-container to the projection position they pass through the outlet 46 of the slide container. This outlet 46 has a width corresponding to the thickness of a slide of maximum thickness. In the region of the outlet 46 are located the blocking leg 47 of a blocking lever 48 and a blocking leg 49 of a blocking lever 50, so that in this embodiment there are a pair of blocking levers which form the blocking means. In the non-blocking position of this blocking means both of the blocking legs 47 and 49 are displaced from the outlet 46 so that a slide of maximum thickness can move therethrough. If only the blocking leg 47 obstructs the outlet 46, then its width has been reduced to such an extent that a slide of intermediate thickness can pass therethrough. The width of the outlet is reduced to an extent sufficient to permit passage of only a slide of minimum thickness when the additional blocking leg 49, either by itself or together with the blocking leg 47, is situated in a position obstructing the outlet 46.

The blocking levers 48 and 50 have a common pivot whose pivot axis is indicated by the dot-dash line 51. Each blocking lever turns on the pivot with a force of friction sufficient to maintain each blocking lever in whichever position it has been turned to. This embodiment also includes a sensing means made up, in part, of a pair of sensing legs 52 and 53 respectively fixed to and projecting from the blocking levers 48 and 50 in the same way that the sensing leg 32 is fixed to and projects from the blocking leg 30. A positioning means 54 is in the form of a projection carried by the slide-changing means 43, and when the latter is shifted from its starting position receiving a slide from the slide-container to its end position, positioning the slide in the projection position, the positioning projection 54, in the same way as the projection 35 of FIGS. 4–7, engages the sensing legs 52 and 53, so that upon displacement of a slide to the projecting position the positioning means 54 will automatically place the sensing means in a sensing position and place the blocking means in its non-blocking position. The blocking levers 48 and 50, including their blocking legs and the pair of sensing legs fixed thereto, are identical except that the sensing legs have sensing edges directed toward the outlet 46 and displaced one with respect to the other when the sensing means is in its sensing position. When the slide-changing means 43 locates a slide in the projecting position, the positioning means 54 reaches the line 54' in which it has engaged and displaced the sensing legs 52 and 53 into their sensing positions. At this time the sensing edge of the sensing leg 52 will be located at the line 55 while the sensing edge of the sensing leg 53 will be located at the line 56, both of these lines being indicated in FIG. 8. For reasons explained below the sensing leg 52 is shown in FIG. 8 at the line 55 while the sensing leg 53 is shown in FIG. 9 at the line 56. Of course, when the sensing legs have been displaced to their sensing positions the blocking legs are displaced from the outlet 46, so that a slide of maximum thickness can pass therethrough.

The sensing means further includes a sensing opening 57 formed in the wall of the container 41 which is opposed to the outlet 46 thereof. This sensing opening 57 of course receives the sensing legs 52 and 53 when they are in their sensing positions. In the interior of the slide-container the sensing opening 57 has the stepped configuration shown in FIGS. 8 and 9. The first step of the sensing opening provides a width only great enough for a slide of minimum thickness while the second step provides an opening great enough to receive a slide of intermediate thickness. The first step is in the plane of the sensing leg 53 while the second step is in the plane of the sensing leg 52. The two steps of the sensing opening are interconnected along the line 56.

The slide-changing means 43 includes a slide-engaging member 58 for engaging and moving the slides from the container 41 to the projection window 45, and the slide-changing means has a second slide-engaging projection 59 which tends to displace the slides in the opposite direction during return of the slide-changing means back to its starting position.

The above-described structure of FIGS. 8 and 9 operates in the following manner:

In the example shown in FIG. 8 a slide 42' of minimum thickness is the next slide which is to be projected. During return of the slide-changer 43 to the starting position of FIG. 8, the projection 59 thereof has engaged the slide 42' and shifted it to the left, as viewed in FIG. 8. The left edge of the slide 42', which initially was in the plane of the line 55, has first moved freely toward and then engaged the sensing leg 53 so that by the time the left edge of the slide 42' has reached the line 56, it will have engaged the sensing leg 53, as pointed out above. The further movement of the slide 42' causes displacement of the sensing leg 53 to the end position indicated by the line 60, and in this position the blocking lever 50 has been turned so as to locate the blocking leg 49 in a position obstructing the outlet 46. The width of the outlet 46 has therefore been reduced in this way to such an extent that only a slide 42' of minimum thickness can pass therethrough. FIG. 8 shows the parts in this latter position where the blocking leg 49 blocks the opening 46. The slide 42'', which engages the slide 42' and in the illustrated example is a slide of intermediate thickness, is retained by the blocking leg 49 against movement with the slide 42' to the projection window 45, when the slide-changer 43 is thereafter moved in the opposite direction from its starting position to its end position so as to cause the projection 58 to engage and displace the slide 42' out of the slide-container into alignment with the projection window 45.

FIG. 9 illustrates the operation of the structure when the next slide 42'' of intermediate thickness is to be displaced to the projection position.

At the end of the return movement of the slide-changing means to its starting position, the slide 42'' is shifted to the left from the line 55 to the line 56 which is determined by the step of the sensing opening 57. As a result, the blocking lever 48 is turned and the blocking leg 47 now obstructs the outlet 46. Inasmuch as the slide 42'' cannot displace the sensing leg 53 which in its sensing position has its sensing edge located at the line 56, since the sensing leg 53 only starts to turn the blocking lever 50 from its blocking position when the sensing leg 53 is displaced to the left from the line 56, as viewed in FIG. 9, the blocking lever 50 remains in its non-blocking position, and only the blocking lever 48 is displaced to its blocking position. Therefore, the width of the outlet 46 is diminished only by the blocking leg 47 which diminishes this width to such an extent that the slide 42″ of intermediate thickness can pass therethrough. A slide which engages the slide 42″, such as the next slide 42‴ of minimum thickness shown in FIG. 9, is retained by the blocking leg 47 against undesired movement to the projection window 45 when the slide-changer 43 is displaced from its starting to its end position toward the right as viewed in FIG. 9.

A slide 42⁗ of maximum thickness cannot be displaced by the projection 59, during return of the slide-changer to its starting position, beyond the inner side surface of the slide-container 41 which is opposed to the outlet 46. Such a slide of maximum thickness cannot move into the sensing opening 57 which is narrower than the maximum thickness. Therefore, a slide of maximum thickness will not displace either of the sensing legs from their sensing positions and the outlet 46 therefore remains fully open. Thus, a slide of maximum thickness can now pass through the outlet 46 substantially filling the latter, so that another slide cannot pass through the outlet 46 simultaneously with a slide of maximum thickness.

Figure 10:
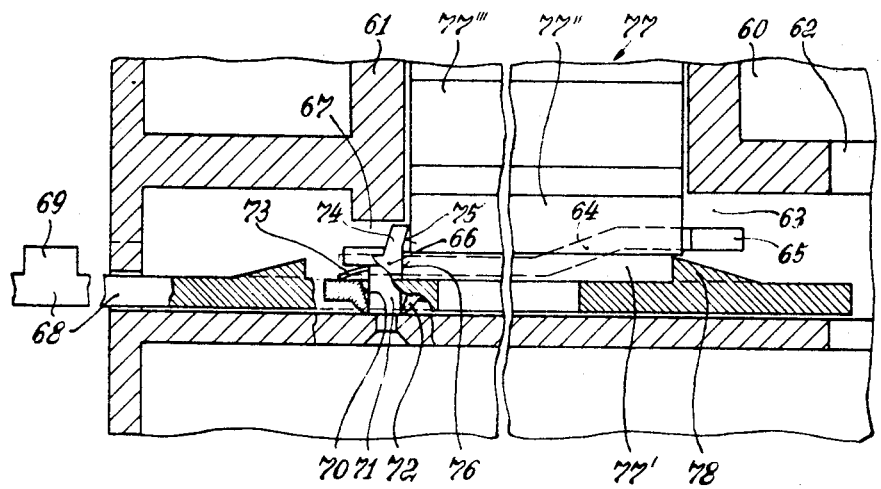
FIGS. 10 and 11 are fragmentary sectional plan views of a third embodiment of a structure according to the invention, FIGS. 10 and 11 also respectively illustrating the structure under two different operating conditions.
Figure 11:
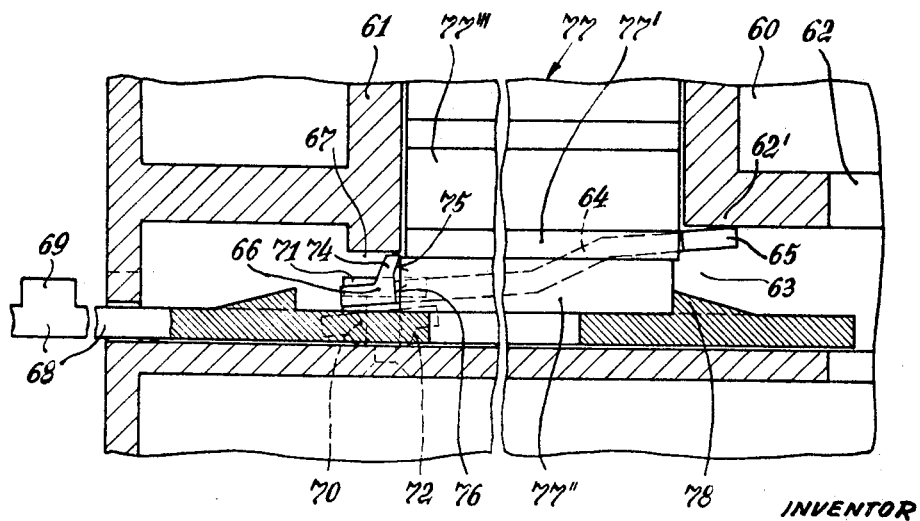

FIGS. 10 and 11 show another embodiment of the invention capable of controlling the movement of slides of three dieffrent thicknesses. In this embodiment the projector 60 also has a slide-container 61, accommodating the slides of different thicknesses, which are haphazardly arranged insofar as their thicknesses are concerned, as was the case with the above embodiments. The projector has the projection window 62 with which the slides are aligned when they are in their projection position, and the container 61 is formed with the outlet 63 whose width is great enough to permit passage of a slide of maximum thickness therethrough. In contrast with the embodiment of FIGS. 8 and 9, the embodiment of FIGS. 10 and 11 is capable of reducing the width of the outlet either to one suitable for a slide of minimum thickness or to one suitable for a slide of intermediate thickness while using only a single blocking lever.

The blocking means of FIGS. 10 and 11 includes, in a manner similar to the above embodiments, a blocking lever 64 which has a blocking leg 65 for obstructing the outlet 63 when the blocking means is in its blocking position. In addition, this embodiment includes a sensing means which has a sensing leg 66 and a sensing opening 67 formed in the wall portion of the container 61 which is opposed to the outlet 63. This sensing opening 67 is of course capable of receiving the sensing leg 66 which is fixed to and projects from the blocking lever 64 in the same way as the above-described sensing legs. Also the blocking leg 65 is fixed to and projects from the lever 64 in the same way as the above-described blocking legs. The sensing opening 67 is narrower than the outlet 63 and can receive only slides of intermediate and minimum thickness. A slide of maximum thickness cannot move into the sensing opening 67 which is narrower than this latter maximum thickness. When the slide-changing means 68, which is substantially identical with the above-described slide-changing means, is shifted from its starting position to its end position, a positioning means 69 in the form of a projection fixed to the slide-changer 68 will engage the sensing leg 66 and displace it into the sensing opening 67 while simultaneously turning the blocking means 64 to its non-blocking position where the blocking leg 65 is displaced from the outlet 63 so that a slide of maximum thickness can pass therethrough.

The blocking means of FIGS. 10 and 11 is different from the above-described embodiment in that the blocking lever 64 can not only turn about the pivot which supports it but in addition can tilt laterally with respect to the pivot axis.

For this purpose the opening 70 of the lever 64, which receives the stationary pivot pin 71, is of a tapered configuration forming part of a cone. Furthermore, the side of the blocking lever 64 which is directed toward the stationary intermediate wall which slideably guides the slide-changer 68 and which fixedly carries pivot pin 71 is provided with a projection 72 surrounding the pivot pin 71 and forming part of a sphere in engagement with this stationary wall. A cup spring 73 surrounds the pivot pin 71, engages a head end thereof, and presses against the lever 64 so as to urge the spherical bearing portion 72 thereof in engagement with the stationary wall which carries the pivot 71. In this embodiment the sensing leg 66 includes an inclined projection 74 which extends away from the slide-changer 68. This projection 74 provides an inclined sensing surface which is directed toward and inclined with respect to the left edge surfaces 75 of the slides and which is also inclined with respect to the surface 76 of the sensing leg 66.

This embodiment of the invention operates as follows:

When, as shown in FIG. 10, the next slide 77′ which is to be projected is a slide of minimum thickness, then when the slide-changer is returned to its starting position, the slide-engaging projection 78 thereof will displace this next slide to the left into engagement with the sensing surface 76 so that, as described with the above embodiments, the blocking lever is turned about its pivot 71 and the blocking leg 65 obstructs the outlet 63 which at this time is reduced to a width only great enough to permit a slide 77′ of minimum thickness to pass therethrough. This is the position of the parts shown in FIG. 10.

If, on the other hand, as shown in FIG. 11, the projection 78 engages a slide 77″ of intermediate thickness then, when this latter slide is moved toward the sensing leg 66, it engages at its edge 75 the inclined projection 74. During the further movement of the slide to the left, the blocking lever 64 is tilted laterally with respect to the pivot 71 in opposition to the force of the cup spring 73 with the spherical bearing part 72 rolling on the stationary supporting wall, and at the same time the blocking lever turns about the pivot 71 so as to locate the blocking leg 65 in the position shown in FIG. 11 obstructing the outlet 63 to an extent only enough to permit passage of a slide 77″ of intermediate thickness. A limiting means limits the extent of tilting the blocking lever, and this limiting means is formed by the surface 62′ which defines one side of the outlet 63. See FIG. 11.

Since the force required to tilt the blocking lever with respect to its pivot is greater than the force required only to turn it about the pivot, a slide of minimum thickness which engages a slide of minimum thickness which is about to be projected will not be able, simply as a result of its frictional engagement with the latter slide, to tilt the blocking lever by being in frictional engagement with the slide which is about to be projected, and therefore under these conditions the blocking lever cannot tilt and will operate as described above and shown in FIG. 10.

A slide 77‴ of maximum thickness cannot enter into the narrower sensing opening 67, so that such a slide of maximum thickness will not displace the blocking lever 64 from its non-blocking position.

Therefore, the embodiment of FIGS. 10 and 11 also is adapted for use with slides of three different thicknesses.

In all of the above-described embodiments of the structure of the invention the slide-engaging members which shift the slide to the projection position as well as those which displace slides of less than maximum thickness in the opposite direction for placing the blocking means in its blocking position, are in the form of fixed members shown as being integral with the slide-changer. Of course, fixed slide-engaging projections which are integral with the slide-changer so as to move therewith present certain disadvantages, as will be apparent from the description below, and in order to avoid these disadvantages, slide-engaging members can be replaced in all of the embodiments by slide-engaging members movably carried by the slide changer in the manner described below.

Figure 12:
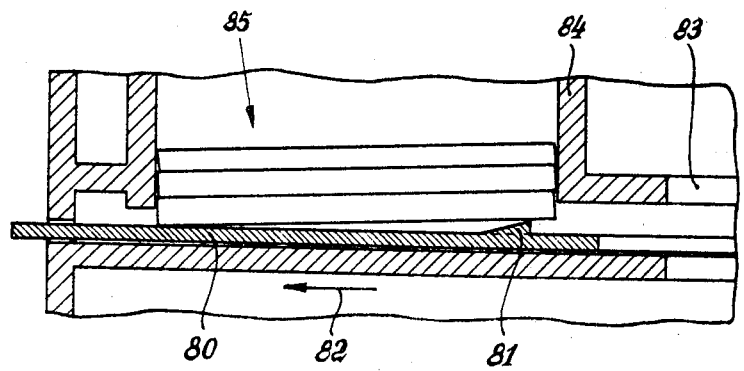
FIG. 12 is a fragmentary sectional plan view showing how a part of the slide changer operates.
Figure 13:
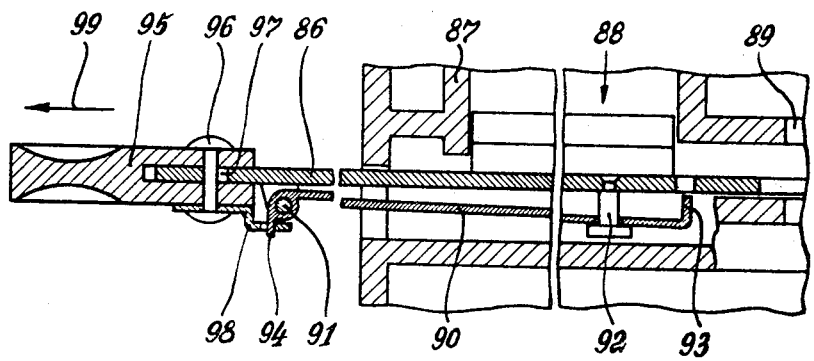
FIGS. 13 and 14 are fragmentary sectional plan views of a feature of the invention which can be used with any of the embodiments thereof for avoiding a problem encountered with the structure of FIG. 12, the parts being shown in different positions in FIGS. 13 and 14, respectively.
Figure 14:
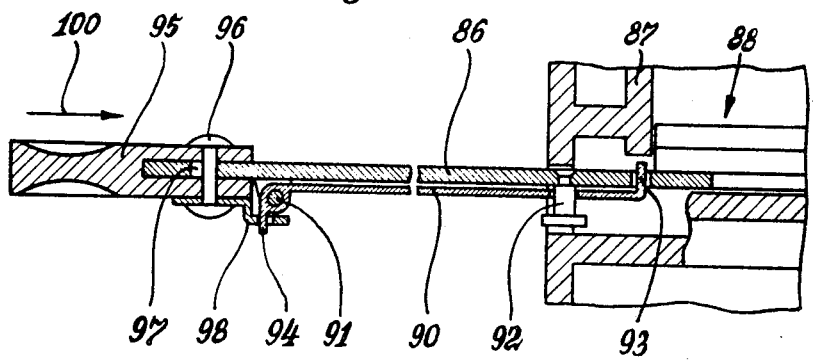

FIGS. 12–14 illustrate the part of the invention which deals with the slide-engaging member for engaging the slide while displacing it to the projection position. For the sake of clarity the details of FIGS. 4–11 are not shown in FIGS. 12–14.

Referring to FIG. 12, the slide-changer 80 shown therein has a slide-engaging projection 81 either fixed to or formed integrally with the slide-changer, as was the case with the above-described embodiments. With such a slide-engaging projection, during return movement of the slide-changer in the direction of the arrow 82, the projection 81 moves away from the projection window 83 into the slide-container 84 so as to engage and slide along the next slide which is to be shifted to the projection position. Of course, this latter slide as well as the remaining slides 85 are pressed so as to tilt away from the slide-changer in the manner shown in FIG. 12. As a result the slides are moved and the force required to return the slide-changer 80 to its starting position must be correspondingly greater than if the slides were not moved. It is to be noted that a greater force would be required even if the projection 81 were yieldably mounted and acted upon by a suitable spring, since in this case also it would be necessary to overcome the force of such a spring when returning the slide-changer to its starting position.

FIGS. 13 and 14 illustrate how this drawback is avoided in accordance with the invention.

The slide-changer 86 of FIGS. 13 and 14 is provided with a movable slide-engaging member 90 to engage and move the slides with the slide-changer to the projection position. The plate which forms the slide-changer 86 fixedly carries a pivot 91 for the lever 90 which forms the slide-engaging element, and a limiting pin 92 passes through an opening of the lever 90 to limit the latter to turning away from the plate of the slide-changer 86 to the extent illustrated in FIG. 13. The lever 90 has a slide-engaging lug 93 for engaging each slide and displacing it from the container 87 to the projection position aligned with the projection window 89. For this purpose the lug 93 can be displaced into the plane of the next slide 88 which is to be projected so as to engage the left edge thereof, as viewed in FIG. 14, and displace it to the projection position when the slide-changing means is shifted to the right from the starting position shown in FIG. 14. Thus, with this construction, within the limits afforded by the limiting means 92, the slide-engaging member 90 can be displaced to and from the position of FIG. 14 where it extends into the plane occupied by the next slide which is to be projected. In the position of the parts shown in FIG. 13, the slide-engaging element 90 is displaced from the plane of the slides and will not engage the latter.

The slide-changing means of FIGS. 13 and 14 includes, in addition to the slideable plate which carries the pivot 91 and in addition to the pivot 91 and the lever 90, a plate-moving member 95 which has a lost-motion connection with the plate 86. This plate-moving member 95 is shown in the illustrated example as a manually engageable member adapted to be engaged and moved by the operator, but it is to be understood that it could also be moved by a suitable motor and transmission. The lost-motion connection between the plate-moving member 95 and the plate 86 is provided by way of a forked portion of the member 95 forming a slot or cavity which slideably receives the left portion of the plate 86. This part of the plate 86 which is received in the cavity of the member 95 is formed with an elongated slot 97 through which a rivet 96 extends, this rivet 96 serving also to fix to the member 95 a lug 98 formed with an opening which receives the left end 94 of the lever 90. This left end 94 of the lever 90 is in the form of a leg projecting from the lever 90 and serving as an arm for turning the lever 90 between the positions of FIGS. 13 and 14 during free movement of the member 95 with respect to the plate 86 as a result of this lost-motion connection. Thus, the plate-moving member 95 has with respect to the plate 86 a free movement the extent of which is determined by the extent of the movement of the shank of the rivet 96 in the slot 97 before engaging the ends of the latter.

When the operator grasps the member 95 and pulls it in the direction of the arrow 99 of FIG. 13, before the rivet 96 reaches the left end of the slot 97 the element 98 will move together the member 95 with respect to the plate 86 while the element 98 engages the leg 94 to turn the lever 90 in a clockwise direction, as viewed in FIG. 13, to the position shown in FIG. 13 where the lug 93 is displaced away from the plane of the next slide which is to be projected and this is the position of the parts during return of the slide-changing means from the projection position to the starting position for displacing the next slide into the projection position. Therefore, with this construction an operation as shown in FIG. 12 cannot take place.

When, however, the slide-changing means is displaced from its starting position, shown in FIG. 14, back toward its end position, the lost-motion connection will again provide a relative movement between the plate-moving member 95 and the plate 86 until the rivet 96 engages the right end of the slot 97, and now the lug 98 will engage the leg 94 so as to turn the lever 90 in a counterclockwise direction from the position of FIG. 13 into position of FIG. 14, so that the lug 93 now becomes located in the plane of the next slide which is to be projected. During the continued movement of this slide-changing means in the direction of the arrow 100 of FIG. 14, the lug 93 will therefore engage the next slide and displace it to the projection plane. As was pointed out above, instead of moving the member 95 by hand, a suitable motor drive or other type of drive can be provided.

In order to displace one slide which is at the projection position away from the latter position by movement of the next slide into the projection position, the following structure is provided in accordance with the invention and, as pointed out above, can be used all embodiments of the invention. FIGS. 16–17 illustrate this part of the invention and for the sake of clarity do not show either the details of FIGS. 4–11 or the features of FIGS. 12 and 13.

In FIG. 15 is shown a slide 101 in its projection position into which it has been displaced by the slide-changer 102. In this position the slide 101 is aligned with the projection window 103 in front of which a condenser lens 104 is situated. The slide 101 has thus been moved in the direction of the arrow 105 out of the slide-container by the slide-engaging element 106 carried by the slide-changer 102. If the slide-changer 102 has an integral or fixed projection 107 thereon, as shown in the embodiments of FIGS. 4–11, then during the return movement of the slide-changer to its starting position, it is not possible, without taking further steps, to displace the slide 101 in the direction of the arrow 105 away from the projection position since the projection 107 will instead tend to return the slide 101 in the direction of the arrow 108.

In order to avoid such return movement of the slide 101 the structure of FIGS. 16 and 17 is provided in accordance with the invention. With the embodiments of FIGS. 16 and 17 the projection 107 is replaced by a slide-engaging member which is movably carried by the slide-changing means.

As may be seen from FIG. 16, the slide-changer 110 carries a pivot 111 on which a lever 112 is pivotally mounted. A leaf-spring 113 is carried by the slide-changing plate 110 and engages the lever 112 so as to urge it to the illustrated position, shown in FIG. 16, and thus the slide-engaging lug 114 of the lever 112 becomes displaced away from the plane occupied by the slide 116 which is in the projection position and cannot engage the latter during the return movement of the slide-changing means. The slide-engaging lug 114 of the lever 112 is accommodated in a suitable opening of the plate 110 in much the same way that the lug 93 of the lever 90 is accommodated in an opening of the plate 86. Thus, when the slide-changer 110 is returned in the direction of the arrow 120 to its starting position the slide 116 will not be returned with the slide-changer. FIG. 17 shows the slide-changer 110 in its starting position. Just before the slide-changer 110 has reached its starting position shown in FIG. 17, the lever 112 has engaged a stationary cam 117 which cams the lever 112, in response to movement of the slide-changer 110 in the direction of the arrow 118, in a clockwise direction about the pivot 111, as viewed in FIG. 17, in opposition to the spring 113, so that the slide-engaging lug 114 is now situated in the plane of the next slide 116' which is to be projected and which can be displaced by the lug 114 in the direction of the arrow 118 to actuate the sensing means as described above. In this way this next slide which is to be projected can be displaced with respect to the other slides in the slide-container 119. Thus, the slide-engaging lever or member 112 is situated in the position of FIG. 17 only when the slide-changer 110 is in the region of its starting position so that the projection 114 will engage a slide with this construction only when the slide-changer is in the region of its starting position.

Thus, it is of particular advantage to provide all of the embodiments of FIGS. 4–11 with the features of FIGS. 13 and 14 as well as with the features of FIGS. 16 and 17.

What is claimed is:

1. In a photographic slide projector, a slide container formed with an outlet through which slides in the container are adapted successively to pass from said container to a projection position, said outlet being great enough to permit a slide of maximum thickness to pass therethrough, slide-changing means transversely shiftable with respect to said container between starting and end positions, said slide-changing means engaging a slide in said starting position and shifting the slide through said outlet to said projection position during displacement of said slide-changing means from said starting to said end position thereof, said slide-changing means then returning from said end to said starting position thereof in preparation for shifting the next slide through said outlet from said container to said projection position, blocking means having a blocking position obstructing part of said outlet to permit only a slide of less than the said maximum thickness to pass therethrough, said blocking means having a non-blocking position displaced from said outlet to permit a slide of maximum thickness to pass without obstruction through said outlet, and sensing means for sensing the thickness of a slide which is in a position to pass through said outlet from said container to said projection position, said sensing means including a wall portion of said container situated opposite said outlet thereof and formed with a sensing opening, said slide-changing means when returning from said end to said starting position thereof tending to move the slide which is to be next shifted to the projection position towards said opening for providing sensing of the latter slide by said sensing means, said sensing means responding to the sensing of a slide of maximum thickness for controlling the positioning of said blocking means in said non-blocking position and said sensing means responding to sensing a slide of less than maximum thickness for controlling the positioning of said blocking means in said blocking position.

2. The combination of claim 1 and wherein said sensing opening is narrower than said outlet so that a slide of maximum thickness cannot be displaced into said sensing opening while a slide of less than said maximum thickness can be received in said sensing opening.

3. The combination of claim 2 and wherein said blocking means includes a lever having a blocking leg and a pivot supporting said lever for turning movement, between a non-blocking position where said blocking leg is displaced from said outlet and a blocking position where said blocking leg obstructs part of said outlet, said sensing means including a sensing leg fixed to part of said lever and situated in the region of said sensing opening, said sensing leg being engaged by a slide displaced into said sensing opening for turning said lever from said non-blocking to said blocking position thereof.

4. The combination of claim 3 and wherein said blocking lever has an offset situating said blocking leg in a plane displaced from a plane in which said sensing leg is situated.

5. The combination of claim 3 and wherein said lever is turnable about said pivot and tiltable with respect thereto.

6. The combination of claim 5 and wherein said lever has a projection forming part of a sphere and surrounding said pivot to support said lever for tilting movement relative thereto, and said lever having a tapered bore receiving said pivot to provide clearance for tilting movement of said lever with respect to said pivot.

7. The combination of claim 6 and wherein said pivot provides a predetermined turning axis for said lever, said sensing leg having directed toward the outlet for engagement by the next slide to be shifted to the projection position a surface extending parallel to said axis and a second surface inclined to said axis and having a length approximately equal to said parallel surface.

8. The combination of claim 7 and wherein a stop means is situated in the path of tilting movement of said lever for limiting the extent of tilting thereof.

9. The combination of claim 2 and wherein said blocking means includes a pair of blocking levers and a common pivot supporting both of said levers for turning movement between blocking and non-blocking positions, said blocking levers respectively having blocking legs displaced from said outlet when said levers are in non-blocking positions, respectively, and obstructing said outlet when said levers are in blocking positions, respectively, and said sensing means including a pair of sensing legs respectively fixed to said levers and situated in the region of said sensing opening to be engaged by a slide received in said sensing opening for turning one of the other of the levers to said blocking position thereof.

10. The combination of claim 9 and wherein said blocking levers including said blocking legs thereof are substantially identical, said sensing legs respectively having sensing edges directed toward said outlet and displaced one with respect to the other when said blocking levers are in their non-blocking positions, respectively.

11. The combination of claim 1 and wherein a positioning means coacts with said sensing means for placing the latter in a position for sensing the thickness of the next slide which is to be shifted to the projection position, said positioning means being actuated by said slide-changing means.

12. The combination of claim 1 and wherein said slide-changing means includes a shiftable plate, a plate-moving member having a lost-motion connection with said plate providing free movement of said plate-moving member with respect to said plate before transmitting motion thereto, and a slide-engaging member carried by said plate for movement to and from an engaging position situated in a plane occupied by a slide for engaging the latter to move said slide with said plate, said plate-moving member during free movement with respect to said plate in one direction displacing said slide-engaging member out of the plane occupied by said slide, during movement of said plate-moving member with respect to said plate just before said plate-moving member transmits motion thereto for returning said slide-changing means from said end position thereof to said starting position thereof, and said plate-moving member during free movement with respect to said plate in an opposite direction displacing said slide-engaging member into said plane for engaging a slide and moving the latter with said plate during subsequent continued movement of said plate-moving member to displace said plate from said starting to said end position thereof.

13. The combination of claim 12 and wherein a limiting means coacts with said slide-engaging member for limiting the extent of movement thereof with respect to said plate.

14. The combination of claim 1 and wherein a slide-engaging member is movably carried by the said slide-changing means for movement to and from a position located in a plane occupied by a slide for tending to displace the slide toward said sensing means upon return of said slide-changing means from said end position thereof to said starting position thereof, and spring means coacting with said slide-engaging member for yieldably urging the latter out of the plane occupied by a slide.

15. The combination of claim 14 and wherein a cam means is situated in the path of movement of said slide-engaging member for engaging the latter during return of said slide-changing means from said end position thereof to said starting position thereof to displace said slide-engaging member into said plane in opposition to said spring means for engaging a slide only when said slide-changing means is in the region of said starting position thereof.

References Cited
UNITED STATES PATENTS 3,273,454    9/1966    Bast _____ 40—79 XR EUGENE R. CAPOZIO, *Primary Examiner.*

WILLIAM H. GRIEB, *Assistant Examiner.*